(12) United States Patent
Mori

(10) Patent No.: US 11,198,398 B2
(45) Date of Patent: Dec. 14, 2021

(54) DISPLAY CONTROL DEVICE FOR VEHICLE, DISPLAY CONTROL METHOD FOR VEHICLE, AND STORAGE MEDIUM

(71) Applicant: Toyota Jidosha Kabushiki Kaisha, Toyota (JP)

(72) Inventor: Masashi Mori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/701,654

(22) Filed: Dec. 3, 2019

(65) Prior Publication Data

US 2020/0180519 A1 Jun. 11, 2020

(30) Foreign Application Priority Data

Dec. 5, 2018 (JP) .............................. JP2018-228534

(51) Int. Cl.
| | | |
|---|---|---|
| G09G 5/00 | (2006.01) | |
| B60R 11/02 | (2006.01) | |
| B60K 35/00 | (2006.01) | |
| G02B 27/01 | (2006.01) | |
| G02B 27/00 | (2006.01) | |

(52) U.S. Cl.
CPC .......... *B60R 11/0235* (2013.01); *B60K 35/00* (2013.01); *G02B 27/0093* (2013.01); *G02B 27/017* (2013.01); *B60K 2370/1529* (2019.05); *B60K 2370/178* (2019.05); *B60K 2370/194* (2019.05); *B60R 2300/205* (2013.01); *B60R 2300/308* (2013.01); *B60R 2300/8033* (2013.01); *B60R 2300/8093* (2013.01); *G02B 2027/0178* (2013.01)

(58) Field of Classification Search
CPC ........................... G02B 27/0172; G06F 3/013
See application file for complete search history.

(56) References Cited

U.S. PATENT DOCUMENTS

| 8,346,426 B1 * | 1/2013 | Szybalski .......... G01C 21/3676 701/28 |
|---|---|---|
| 2010/0253541 A1* | 10/2010 | Seder ..................... G08G 1/165 340/905 |
| 2014/0218268 A1* | 8/2014 | Olesen ............... G08G 1/09623 345/7 |
| 2016/0098138 A1* | 4/2016 | Park ................. H04N 5/232935 345/173 |
| 2016/0203582 A1* | 7/2016 | Nakai ................ G02B 27/0179 345/632 |

FOREIGN PATENT DOCUMENTS

| JP | 2004-322680 A | 11/2004 |
|---|---|---|
| JP | 2013-025635 A | 2/2013 |

* cited by examiner

*Primary Examiner* — Nan-Ying Yang
(74) *Attorney, Agent, or Firm* — Dinsmore & Shohl LLP

(57) ABSTRACT

A display control device for a vehicle include: an acquisition unit that acquires information of an object located at a progress path of the vehicle; and a display control unit that, on the basis of the information acquired by the acquisition unit, causes information of the object to be displayed at a display unit of a spectacles-form wearable terminal, the wearable terminal being provided with the display unit and being configured to be worn by an occupant of the vehicle.

16 Claims, 12 Drawing Sheets

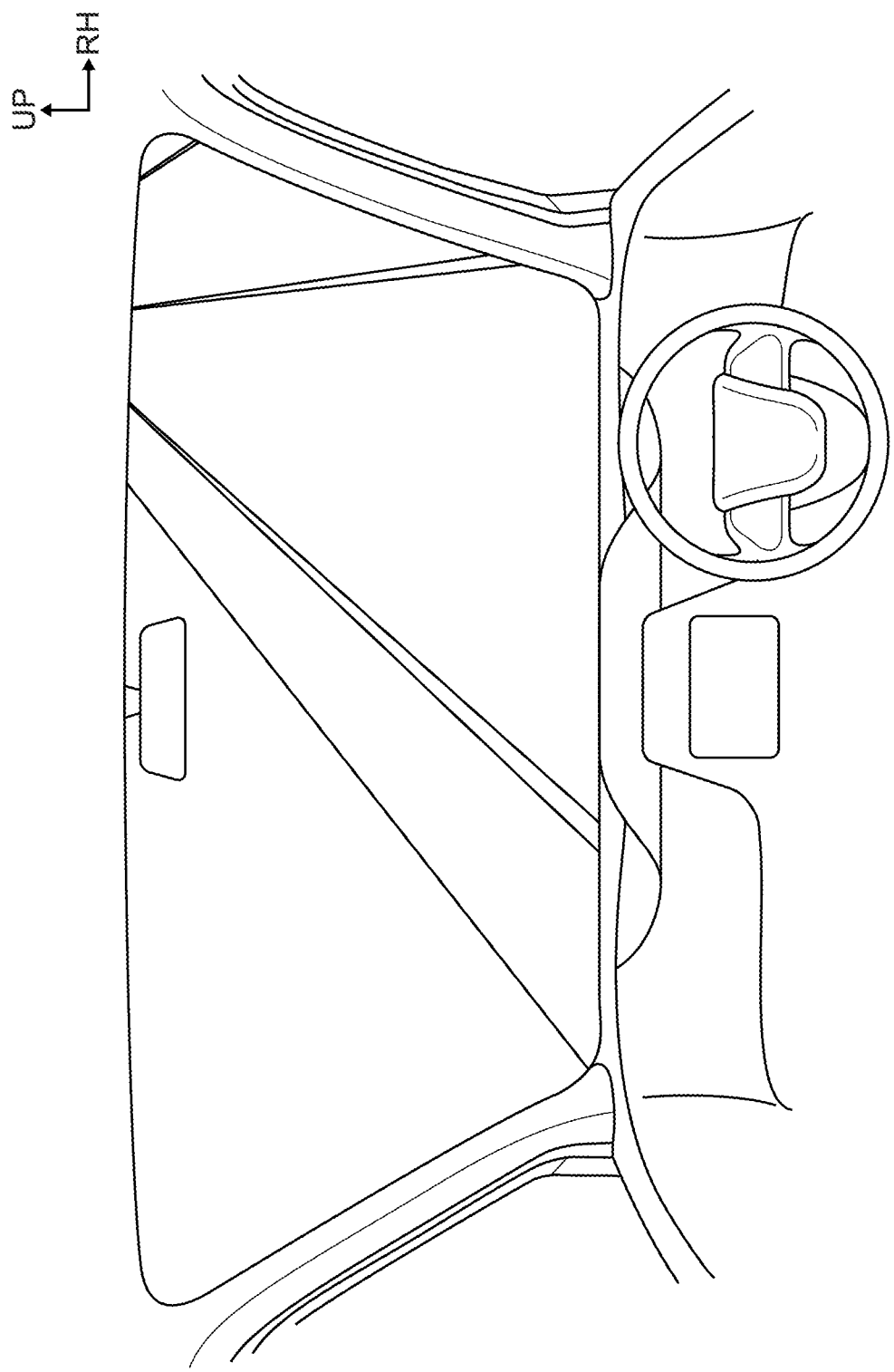

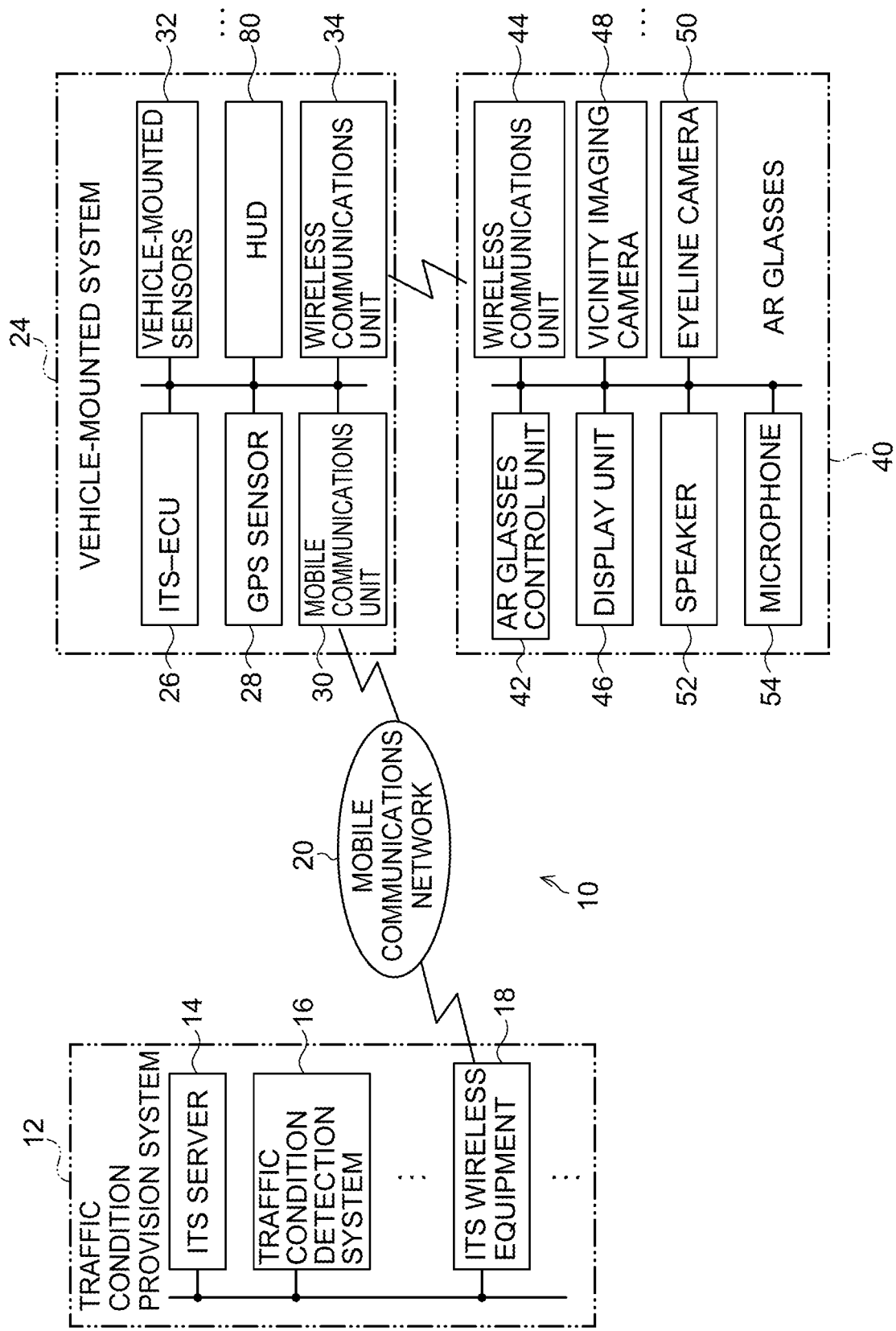

DISPLAY CONTROL DEVICE FOR VEHICLE, DISPLAY CONTROL METHOD FOR VEHICLE, AND STORAGE MEDIUM

CROSS-REFERENCE TO RELATED APPLICATION

This application is based on and claims priority under 35 USC 119 from Japanese Patent Application No. 2018-228534 filed on Dec. 5, 2018, the disclosure of which is incorporated by reference herein.

BACKGROUND

Technical Field

The present disclosure relates to a display control device for a vehicle, a display control method for a vehicle, and a storage medium storing a display control program for a vehicle.

Related Art

Japanese Patent Application Laid-Open (JP-A) No. 2013-025635 describes a technology that assists driving of a vehicle by, when infrastructure information relating to traffic conditions at an intersection is acquired before the vehicle enters the intersection, predicting the output of alert information during a right turn or left turn, and when the vehicle has entered the intersection, outputting the alert information.

The technology recited in JP-A No. 2013-025635 displays prediction information and the alert information at a display in an equipment meter mounted in the vehicle. Therefore, for example, if a walker is located in a vicinity of the intersection at which the vehicle will turn left or right, the direction of an eyeline of an occupant for viewing the information of the walker displayed at the display differs greatly from the direction of an eyeline of the occupant for viewing the intersection of the left or right turn, which is to say a direction in which the walker is actually located. Therefore, it is difficult for the occupant to instinctively understand the information displayed at the display.

SUMMARY

The present disclosure is made in consideration of the circumstances described above, and provides a display control device for a vehicle, a display control method for a vehicle and a storage medium storing a display control program for a vehicle that may allow an occupant to easily understand information of an object located in a progress path of the vehicle.

One aspect of the present disclosure is a display control device for a vehicle, including: an acquisition unit that acquires information of an object located at a progress path of the vehicle; and a display control unit that, on the basis of the information acquired by the acquisition unit, causes information of the object to be displayed at a display unit of a spectacles-form wearable terminal, the wearable terminal being provided with the display unit and being configured to be worn by an occupant of the vehicle.

In the present aspect, the information of an object located at the progress path of the vehicle is displayed at the display unit of the spectacles-form wearable terminal at which the display unit is provided and that is worn by the occupant of the vehicle. Therefore, the direction of an eyeline of the occupant for viewing the information of the object displayed at the display unit of the wearable terminal is close to a direction in which the object in the progress path of the vehicle is located as viewed by the occupant. Therefore, the occupant may be allowed to easily understand the information of the object located in the progress path of the vehicle.

In the present aspect, the display control unit may cause the information of the object to be displayed at a position of the display unit that corresponds with a direction in which the object is located as seen by the occupant.

In the aspect described above, the information of the object is displayed at a position in the display unit that corresponds with the direction in which the object is located as seen by the occupant. As a result, the direction of the eyeline of the occupant for viewing the information of the object displayed at the display unit of the wearable terminal may be even closer to the direction in which the object in the progress path of the vehicle is located as viewed by the occupant. Therefore, the occupant may be allowed to more easily understand the information of the object located in the progress path of the vehicle.

In the present aspect, the display control unit may cause the information of the object to be displayed at the display unit of the wearable terminal in a case in which the display control unit determines that the object is obscured by an obstruction as seen by the occupant.

In the aspect described above, the information of the object is displayed in the display unit of the wearable terminal in a case in which it is determined that the object is obscured by an obstruction as seen by the occupant. Therefore, information of an object is displayed at the wearable terminal when the object is obscured by an obstruction as seen by the occupant; that is, when there is a strong need for the occupant to be made aware of the presence of the object. Thus, overcrowding of displays at the display unit of the wearable terminal may be suppressed.

In the present aspect, a vicinity imaging unit may be provided at the wearable terminal, and the display control unit may make a determination as to whether the object is obscured by an obstruction as seen by the occupant on the basis of a vicinity imaging image in which a vicinity of the vehicle is imaged by the vicinity imaging unit.

The determination as to whether the object is obscured by an obstruction as seen by the occupant might use, for example, an image imaged by an imaging unit provided at the vehicle or the like. However, the difference between a position of the eyes of the occupant and an imaging position of the imaging unit may cause errors in the determination. However, in the above configuration, the determination is based on a vicinity imaging image in which the vicinity of the vehicle is imaged by the vicinity imaging unit provided at the wearable terminal. Therefore, because the imaging position of the vicinity imaging unit is close to the position of the eyes of the occupant, errors in the determination may be reduced.

In the present aspect, the display control unit may cause a graphic schematically representing an outline of the object to be displayed as the information of the object.

In the aspect described above, because the graphic schematically representing the outline of the object is displayed as the information of the object, the occupant may be allowed to instinctively understand the location of the object, particularly in a situation in which the object is obscured by an obstruction as seen by the occupant.

In the present aspect, after the display control unit causes the information of the object to be displayed at the display unit of the wearable terminal, the display control unit may cause the display of the information of the object to be erased in a case in which the display control unit determines that the information of the object has been perceived by the occupant.

In the aspect described above, after the information of the obstacle has been displayed in the display unit of the wearable terminal, the display of the information of the object is erased in a case in which it is determined that the occupant is aware of the information of the object. Therefore, overcrowding of displays at the display unit of the wearable terminal may be suppressed, and awareness by an occupant of the location of an object that the occupant was not aware of may be facilitated.

In the present aspect, an eyeline detection unit may be provided at the wearable terminal, and the display control unit may make a determination as to whether the information of the object has been perceived by the occupant on the basis of results of detection of a direction of an eyeline of the occupant by the eyeline detection unit.

Whether or not an occupant is aware of information of an object might be determined by, for example, the occupant operating an operation unit such as a switch or the like. However, operations by an occupant increase complexity. In some embodiments, the determination may be made on the basis of results of detection of the direction of the eyeline of the occupant by the eyeline detection unit provided at the wearable terminal. Thus, an increase in complexity of operations by the occupant may be avoided.

In the present aspect, a head-up display may be provided at a front windshield of the vehicle, and the display control unit may cause the information of the object to be displayed at the display unit of the wearable terminal in a case in which the display control unit determines that the object is located in a direction as seen by the occupant that is not projected in the head-up display.

In the aspect described above, in a mode in which a head-up display (HUD) is provided at a front windshield of a vehicle, if it is determined that an object is located in a direction as seen by the occupant that would not be projected in the HUD, information of the object is displayed in the display unit of the wearable terminal. Therefore, in a mode in which the HUD and the wearable terminal cooperate to display information of an object, information in a range that cannot be displayed in the HUD may be displayed in the wearable terminal. Thus, displays by the HUD may be complemented by the wearable terminal. Moreover, because the display of information is divided between the HUD and the wearable terminal, the HUD may be made smaller.

Another aspect of the present disclosure is a display control method for a vehicle, including: acquiring information of an object located at a progress path of the vehicle; and, on the basis of the acquired information, controlling such that information of the object is displayed at a display unit of a spectacles-form wearable terminal, the wearable terminal being provided with the display unit and being worn by an occupant of the vehicle.

Still another aspect of the present disclosure is a non-transitory computer readable storage medium storing a program causing a computer to execute display control processing for a vehicle, the display control processing for a vehicle including: acquiring information of an object located at a progress path of the vehicle; and, on the basis of the acquired information, controlling such that information of the object is displayed at a display unit of a spectacles-form wearable terminal, the wearable terminal being provided with the display unit and being worn by an occupant of the vehicle.

Thus, in aspects of the present disclosure, an occupant may be allowed to easily understand information of an object located in a progress path of a vehicle.

BRIEF DESCRIPTION OF THE DRAWINGS

FIG. 11 is an image illustrating another example of the field of view seen by the occupant through the AR glasses as a result of the front field of view improvement processing.

FIG. 12 is a block diagram illustrating alternative schematic structures of the driving assistance system.

DETAILED DESCRIPTION

Figure 1:
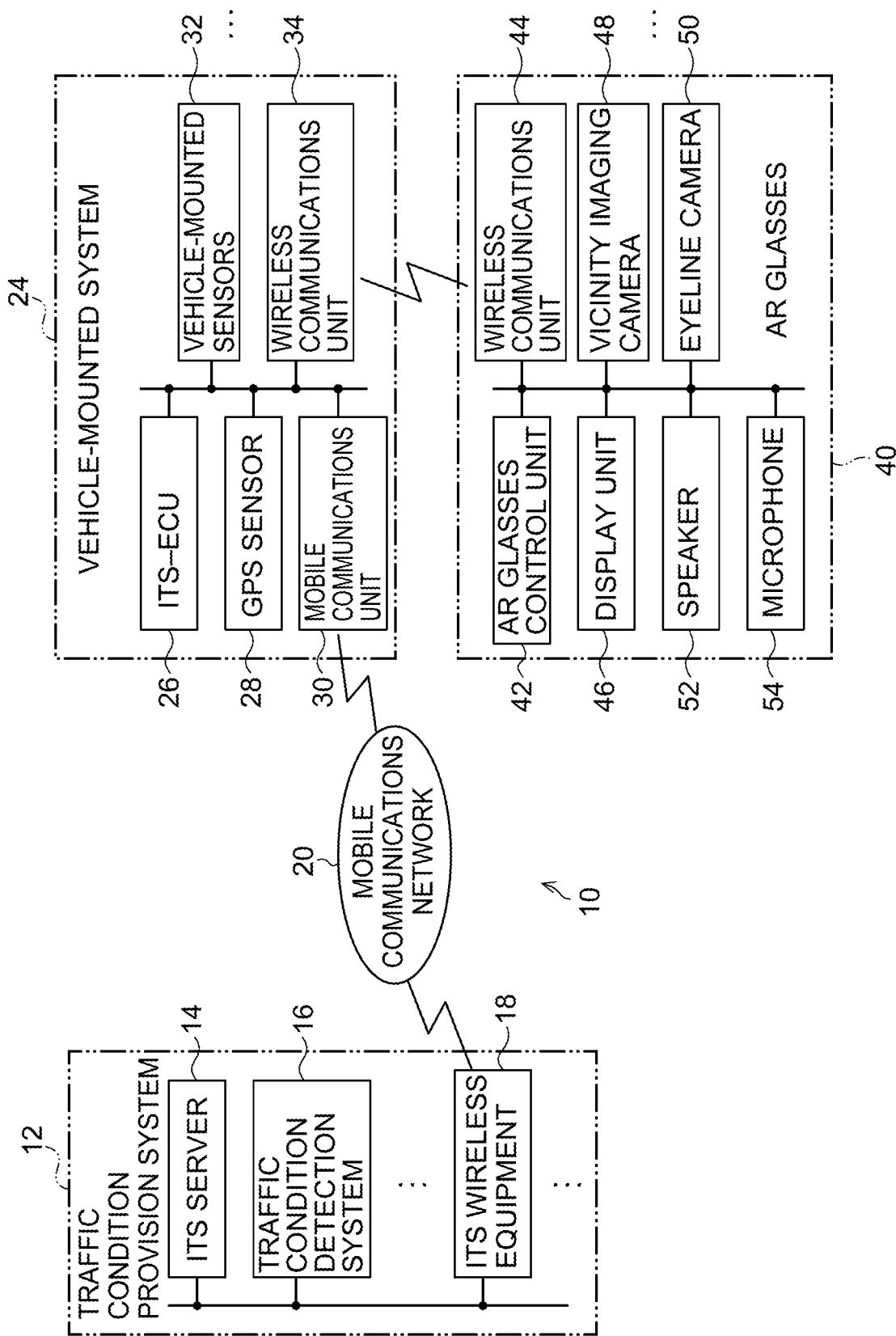
FIG. 1 is a block diagram illustrating schematic structures of a driving assistance system.

Herebelow, an example of an embodiment of the present disclosure is described in detail with reference to the attached drawings. FIG. 1 illustrates a traffic condition display system 10 according to the present exemplary embodiment. The traffic condition display system 10 includes a traffic condition provision system 12 provided at the road, vehicle-mounted systems 24 respectively mounted in vehicles 22 (see FIG. 5), and augmented reality (AR) glasses 40 worn by an occupant of each vehicle 22 in which the vehicle-mounted system 24 is mounted.

The traffic condition provision system 12 includes an intelligent transport system (ITS) server 14, a traffic condition detection system 16 and ITS wireless equipment 18. The ITS wireless equipment 18 communicates with the vehicle-mounted system 24 of the vehicle 22 via a mobile communications network 20.

The traffic condition detection system 16 includes traffic condition sensors that are disposed at plural locations at the road side such as, for example, intersections and the like. Each traffic condition sensor includes at least one of: a camera that images objects such as, for example, vehicles, walkers, cyclists and the like; a lidar ("light detection and ranging" or "laser imaging detection and ranging") that detects objects with laser light in the infrared range; or a radar that detects objects with electromagnetic waves at predetermined wavelengths. On the basis of the results of detection of objects by the traffic condition sensors, the traffic condition detection system 16 detects positions and the like of the objects and reports the same to the ITS server 14.

The ITS server 14 periodically receives information including the current position of each mobile vehicle 22 in which the vehicle-mounted system 24 is mounted from the respective vehicles 22 in which the vehicle-mounted systems 24 are mounted. The current position (latitude and longitude) of each vehicle 22 is detected by a global positioning system (GPS) sensor 28, which is described below. When the vehicle 22 in which the vehicle-mounted system 24 is mounted is within a predetermined distance L1 from an intersection (a processing target intersection), the ITS server 14 transmits infrastructure information relating to traffic conditions at the processing target intersection to the vehicle 22.

The infrastructure information transmitted from the ITS server 14 to the vehicle-mounted system 24 includes at least intersection information. The intersection information includes at least information relating to the position of the processing target intersection, and may include information relating to one or both of the layout of the processing target intersection and a traffic signal at the processing target intersection. The layout of the processing target intersection includes being, for example, a crossroad, a T junction, a Y junction, a scramble intersection, a rotary intersection or the like. The traffic signal at the processing target intersection includes being, for example, a green signal, an amber signal, a red signal, a green arrow, an amber arrow, a flashing amber signal, a flashing red signal or the like.

In cases in which an object located in a vicinity of the processing target intersection is detected, the infrastructure information includes object information. The object information includes, for example, vehicle information in a case in which a vehicle is detected approaching the processing target intersection. The vehicle information includes at least information relating to the position of the detected vehicle and the progress direction of the vehicle, and may also include information relating to the speed of the vehicle and a time to collision (TTC) until the vehicle reaches the intersection.

In cases in which, for example, a walker, a cyclist or the like located in a vicinity of the processing target intersection is detected, the object information includes pedestrian information. The pedestrian information includes at least information relating to the position of the walker, cyclist or the like, and may further include information relating to a movement direction of the walker, cyclist or the like and a movement speed of the walker, cyclist or the like.

The vehicle-mounted system 24 includes an ITS-ECU 26, the GPS sensor 28, a mobile communications unit 30, vehicle-mounted sensors 32 and a wireless communications unit 34. The mobile communications unit 30 communicates with the traffic condition provision system 12 via the mobile communications network 20, and the wireless communications unit 34 conducts short-range wireless communications with the AR glasses 40.

The GPS sensor 28 detects the position of the present vehicle. The vehicle-mounted sensors 32 include at least one of a camera that images the vicinity of the vehicle 22, a lidar that detects items located in the vicinity of the vehicle 22 with laser light in the infrared range, and a radar that detects items located in the vicinity of the vehicle 22 with electromagnetic waves at predetermined wavelengths. The vehicle-mounted sensors 32 also include a winker switch and the like. The ITS-ECU 26 executes object notification processing, which is described below, on the basis of infrastructure information received from the traffic condition provision system 12. The ITS-ECU 26 includes at least a central processing unit (CPU), a memory that serves as a temporary storage area, and a nonvolatile storage unit. A control program that causes the ITS-ECU 26 to execute the object notification processing is stored in the storage unit. The CPU of the ITS-ECU 26 reads the control program from the storage unit, loads the control program into the memory, and executes the loaded control program.

The vehicle-mounted system 24 is an example of the display control device for a vehicle. The mobile communications unit 30 is an example of an acquisition unit, and the ITS-ECU 26 is an example of a display control unit.

The AR glasses 40 include an AR glasses control unit 42, a wireless communications unit 44, a display unit 46, a vicinity imaging camera 48, an eyeline camera 50, a speaker 52 and a microphone 54. The wireless communications unit 44 conducts short-range wireless communications with the vehicle-mounted system 24.

Figure 2:
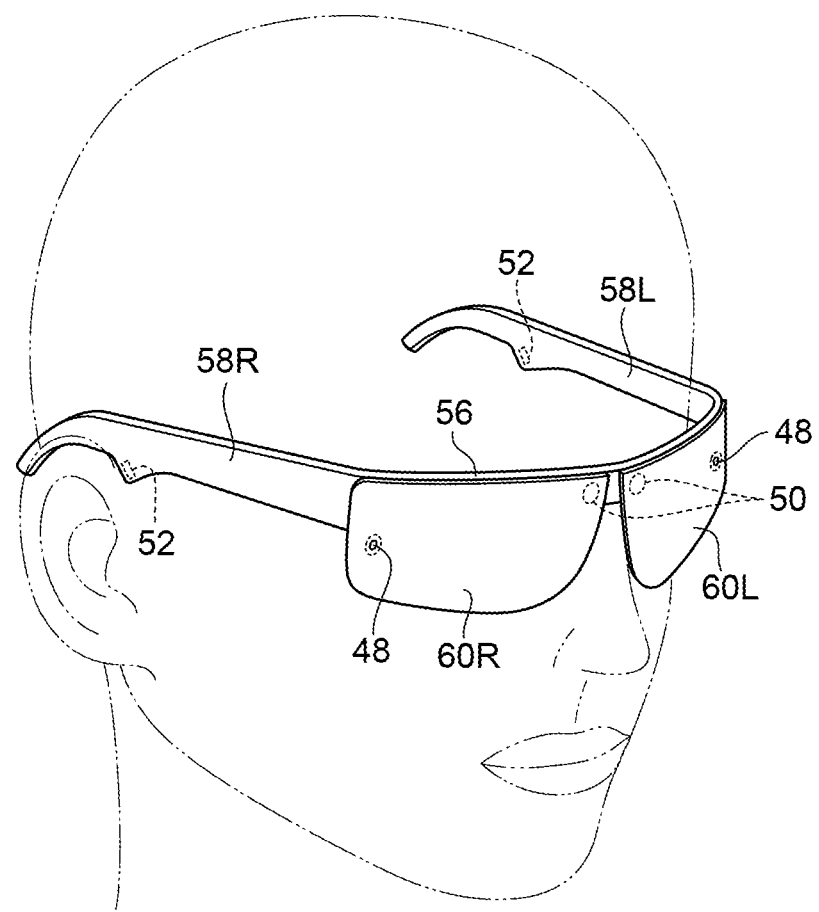
FIG. 2 is a perspective view illustrating the exterior of AR glasses.

As illustrated in FIG. 2, base portions of left and right arms 58L and 58R of the AR glasses 40 are attached to a frame 56, and left and right lens portions 60L and 60R with transparency are attached to the frame 56. The display unit 46, which is capable of displaying images, is provided at each of faces at inner sides of the lens portions 60L and 60R (i.e., faces opposing the eyes of an occupant wearing the AR glasses 40).

The display unit 46 is formed as a see-through display such that light entering the lens portions 60L and 60R from the outer sides of the lens portions 60L and 60R passes through the display unit 46 and enters the eyes of the occupant wearing the AR glasses 40. Thus, once an image is displayed at the display unit 46, the image displayed at the display unit 46 (a virtual image) can be seen overlaid on an actual field of view (for example, a real image of the front of the vehicle 22) through the lens portions 60L and 60R by the occupant wearing the AR glasses 40.

The field of view through the AR glasses 40 extends over a range in the width direction of the vehicle 22 that includes A pillars, side windows and the like of the vehicle 22. The display unit 46 is capable of displaying images even at locations corresponding with the A pillars and side windows of the vehicle 22.

A pair of the vicinity imaging camera 48 are attached to positions of the faces at the outer sides of the lens portions 60L and 60R that do not obstruct the field of view of the occupant wearing the AR glasses 40. The vicinity imaging cameras 48 image to the front of the AR glasses 40. A pair of the eyeline camera 50 are attached to positions of the faces at the inner sides of the lens portions 60L and 60R that do not obstruct the field of view of the occupant wearing the AR glasses 40. The eyeline cameras 50 image the eyes of the occupant wearing the AR glasses 40 to detect an eyeline of the occupant.

A pair of the speaker 52 are provided at locations of the arms 58L and 58R that correspond with the ears of the occupant in the state in which the AR glasses 40 are worn by the occupant. The AR glasses control unit 42 causes images to be displayed at the display unit 46 in response to instructions from the vehicle-mounted system 24, and sends images imaged by the vicinity imaging cameras 48 and eyeline detection results from the eyeline cameras 50 to the vehicle-mounted system 24. The AR glasses control unit 42 may cause sounds to be emitted from the speakers 52 as necessary.

The AR glasses control unit 42, together with the microphone 54, is incorporated in, for example, the frame 56. A battery (not illustrated in the drawings) is incorporated and a power supply jack (not illustrated in the drawings) is provided in, for example, the arms 58L and 58R. Location positions of the AR glasses control unit 42, the microphone 54, the battery and the power supply jack are not limited as described above. The AR glasses 40 are an example of a wearable terminal, the vicinity imaging camera 48 is an example of a vicinity imaging unit, and the eyeline camera 50 is an example of an eyeline detection unit.

Figure 3:
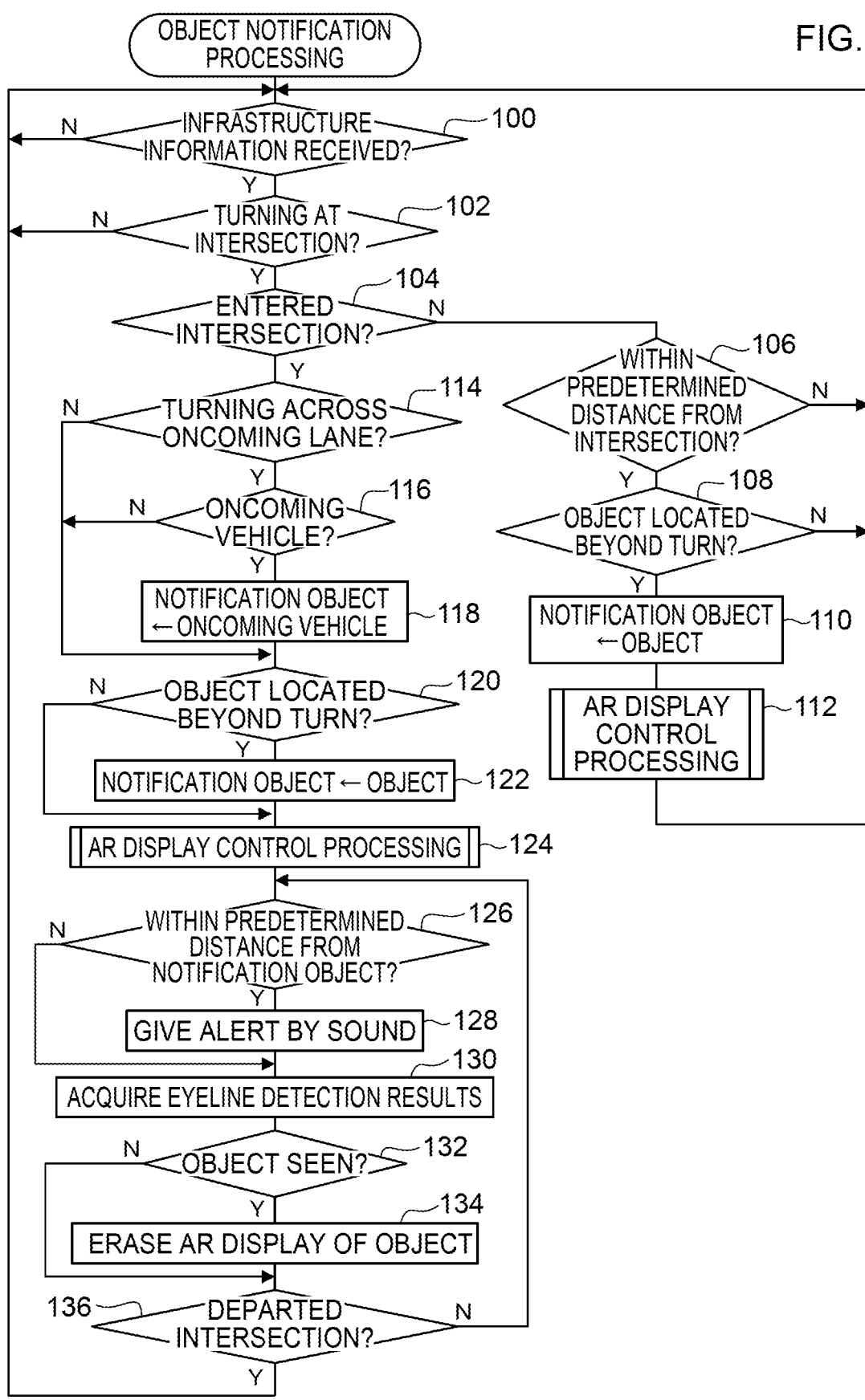
FIG. 3 is a flowchart illustrating object notification processing that is executed by an ITS-ECU.

Now, as operation of the present exemplary embodiment, object notification processing that is executed by the ITS-ECU 26 while an ignition switch of the vehicle 22 is on is described with reference to FIG. 3.

In step 100 of the object notification processing, the ITS-ECU 26 makes a determination as to whether infrastructure information has been received from the traffic condition provision system 12. If the result of the determination in step 100 is negative, the ITS-ECU 26 repeats step 100 until the result is affirmative. When the vehicle 22 approaches to within a predetermined distance L1 from an intersection, the vehicle-mounted system 24 receives infrastructure information from the vehicle-mounted system 24. Hence, the result of the determination in step 100 is affirmative and the ITS-ECU 26 proceeds to step 102.

In step 102, on the basis of information of a winker switch and the like included in the vehicle-mounted sensors 32, the ITS-ECU 26 makes a determination as to whether the present vehicle is to turn at a processing target intersection corresponding to the infrastructure information received from the traffic condition provision system 12. The determination of step 102 may be made by acquiring information of a planned running route from a car navigation device. If the result of the determination in step 102 is negative, the ITS-ECU 26 returns to step 100. Alternatively, if the present vehicle is to turn at the processing target intersection, the result of the determination in step 102 is affirmative and the ITS-ECU 26 proceeds to step 104.

In step 104, the ITS-ECU 26 makes a determination as to whether the automobile has entered the processing target intersection. If the result of the determination in step 104 is negative, the ITS-ECU 26 proceeds to step 106. In step 106, the ITS-ECU 26 calculates a distance between the position of the intersection contained in the received infrastructure information and a position of the present vehicle detected by the GPS sensor 28, and makes a determination as to whether the present vehicle is within a predetermined distance L2 from the processing targeting intersection (L2<L1). If the result of the determination in step 106 is negative, the ITS-ECU 26 returns to step 100, and if the result of the determination in step 106 is affirmative, the ITS-ECU 26 proceeds to step 108.

In step 108, the ITS-ECU 26 makes a determination as to whether an object such as a walker, a cyclist or the like is located beyond the turn by the present vehicle at the processing target intersection. More specifically, the ITS-ECU 26 first makes a determination as to whether pedestrian information is included in the received infrastructure information. If pedestrian information is included in the infrastructure information, the ITS-ECU 26 makes a determination as to whether objects such as walkers, cyclists and the like represented by the pedestrian information include an object such as a walker, a cyclist or the like that is located within a predetermined range from a path along which the present vehicle turning at the processing target intersection is expected to proceed. If the result of the determination in step 108 is negative, the ITS-ECU 26 returns to step 100. Determinations of the locations of walkers, cyclists and the like may include vehicles as objects of determination.

On the other hand, if an object such as a walker, cyclist or the like is present within the predetermined range from the path along which the present vehicle turning at the processing target intersection is expected to proceed, there is a possibility of the present vehicle approaching to less than a predetermined distance from the object when the present vehicle turns at the processing target intersection. Therefore, if the result of the determination in step 108 is affirmative, the ITS-ECU 26 proceeds to step 110 and specifies that the walker, cyclist or the like located within the predetermined range from the expected progress route is a notification object. Then, in step 112, the ITS-ECU 26 executes AR display control processing.

Figure 4:
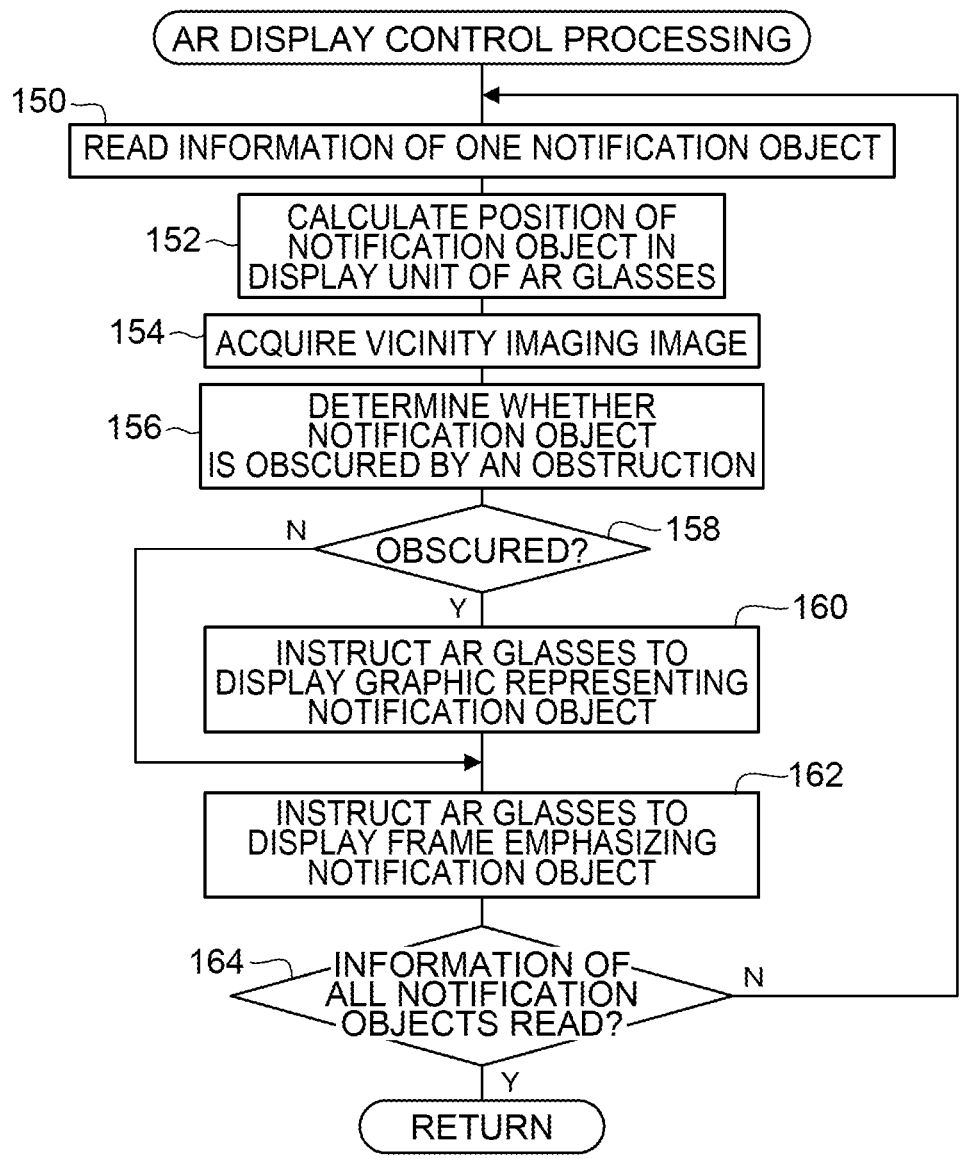
FIG. 4 is a flowchart illustrating AR display control processing that is executed by the ITS-ECU.

As illustrated in FIG. 4, in step 150 of the AR display control processing, the ITS-ECU 26 reads information of one notification target. The information of the notification target that is read includes information of the position, type (walker, cyclist, oncoming vehicle or the like) and the like of the notification target. In step 152, the ITS-ECU 26 calculates a direction in which the notification target is located as seen by the occupant wearing the AR glasses 40, on the basis of the position of the notification target included in the information read in step 150 and the position of the present vehicle detected by the GPS sensor 28. Then, on the basis of the direction in which the notification target is located as seen by the occupant wearing the AR glasses 40, the ITS-ECU 26 calculates a position of the notification target in the display unit 46 of the AR glasses 40.

In step 154, the ITS-ECU 26 acquires a vicinity imaging image imaged by the vicinity imaging cameras 48 of the AR glasses 40. In step 156, the ITS-ECU 26 makes a determination as to whether the notification object is obscured by an obstruction in the vicinity imaging image acquired in step 154. This determination may be made by making a determination as to whether an obstruction appears in an area of the vicinity imaging image that corresponds with the position of the notification object in the display unit 46 of the AR glasses 40 calculated in step 152. For this obstruction determination, an image of the vicinity of the vehicle 22 imaged by a camera included in the vehicle-mounted sensors 32 may be used instead of the vicinity imaging image.

Figure 5:
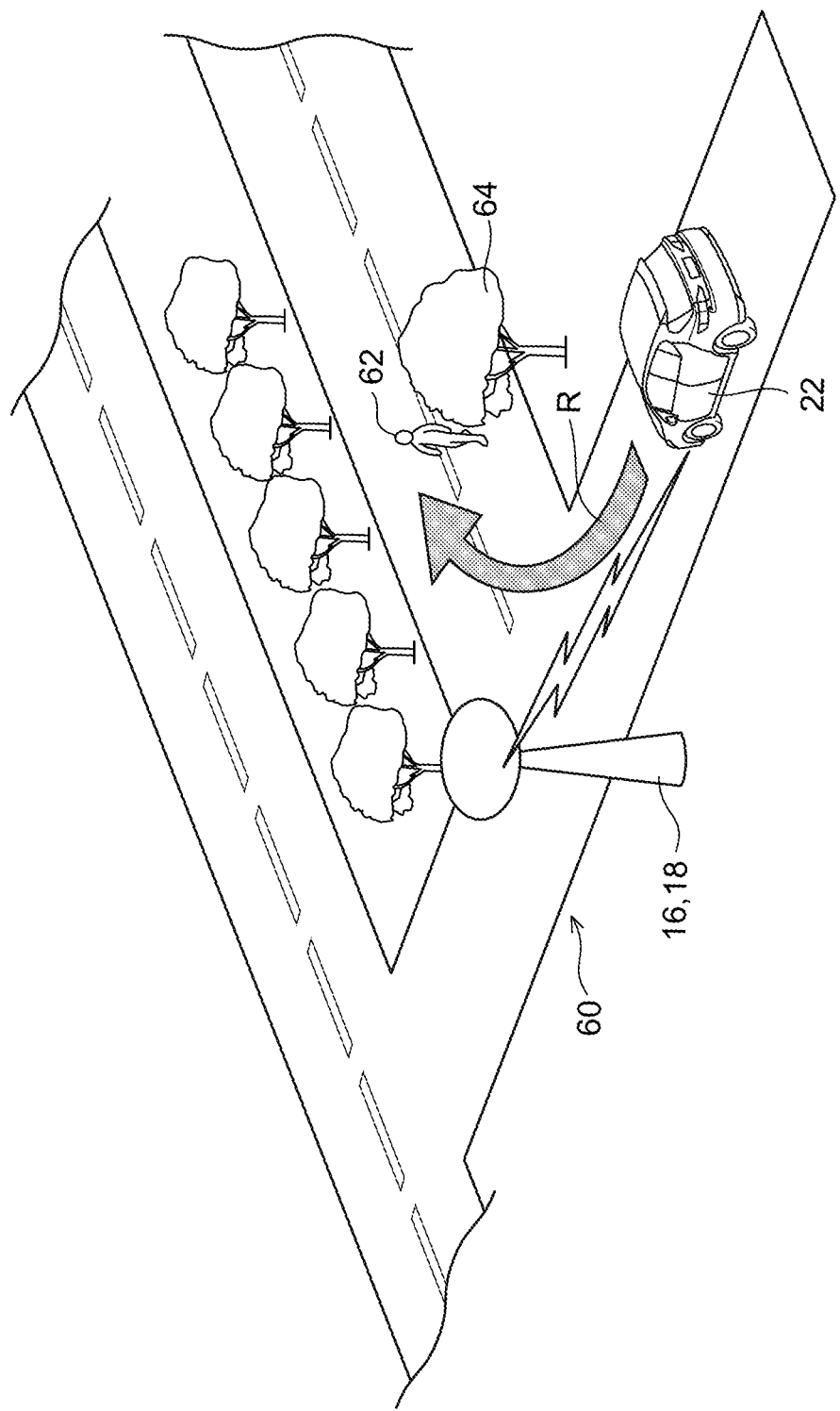
FIG. 5 is a perspective view illustrating, as an example of traffic conditions, a situation in which a walker obscured by an obstruction is present in the progress path of a present vehicle.

For example, in the situation illustrated in FIG. 5, the vehicle 22 is going to turn right at an intersection 60, and a walker 62 is located close to the path along which the vehicle 22 turning right at the intersection 60 is expected to proceed (see arrow R in FIG. 5). The ITS-ECU 26 recognizes the presence of the walker 62 as a notification object as a result of the ITS-ECU 26 of the vehicle 22 receiving infrastructure information from the traffic condition provision system 12 via the ITS wireless equipment 18. However, as seen by an occupant of the vehicle 22, the walker 62 is obscured by an obstruction 64 (in the example in FIG. 5, a tree). Thus, the occupant of the vehicle 22 may not directly see the walker 62 in the situation illustrated in FIG. 5. In this case, it is determined that the notification object is obscured by the obstruction 64. If the obstruction 64 was not present, it would be determined that no obstruction 64 has been obscuring the notification object.

In step 158, the ITS-ECU 26 makes a determination as to whether the notification object has been determined, by the determination in step 156, to be obstructed by the obstruction 64. If the result of the determination in step 158 is affirmative, the ITS-ECU 26 proceeds to step 160. In step 160, the ITS-ECU 26 notifies the AR glasses 40 of the position of the notification object in the display unit 46 of the AR glasses 40 and the type of the notification object, and instructs the display unit 46 to display a graphic schematically representing an outline of the notification object. As a result, the AR glasses control unit 42 causes the graphic schematically representing the outline of the notification object to be displayed at the instructed position in the display unit 46. Alternatively, if the result of the determination in step 158 is negative, the ITS-ECU 26 skips step 160 and proceeds to step 162.

In step 162, the ITS-ECU 26 notifies the AR glasses 40 of the position of the notification object in the display unit 46 of the AR glasses 40, and instructs the display unit 46 to display a frame emphasizing an area in which the notification object is located. As a result, the AR glasses control unit 42 causes a rectangular frame emphasizing the area in which the notification object is located to be displayed at the instructed position in the display unit 46.

Figure 6:
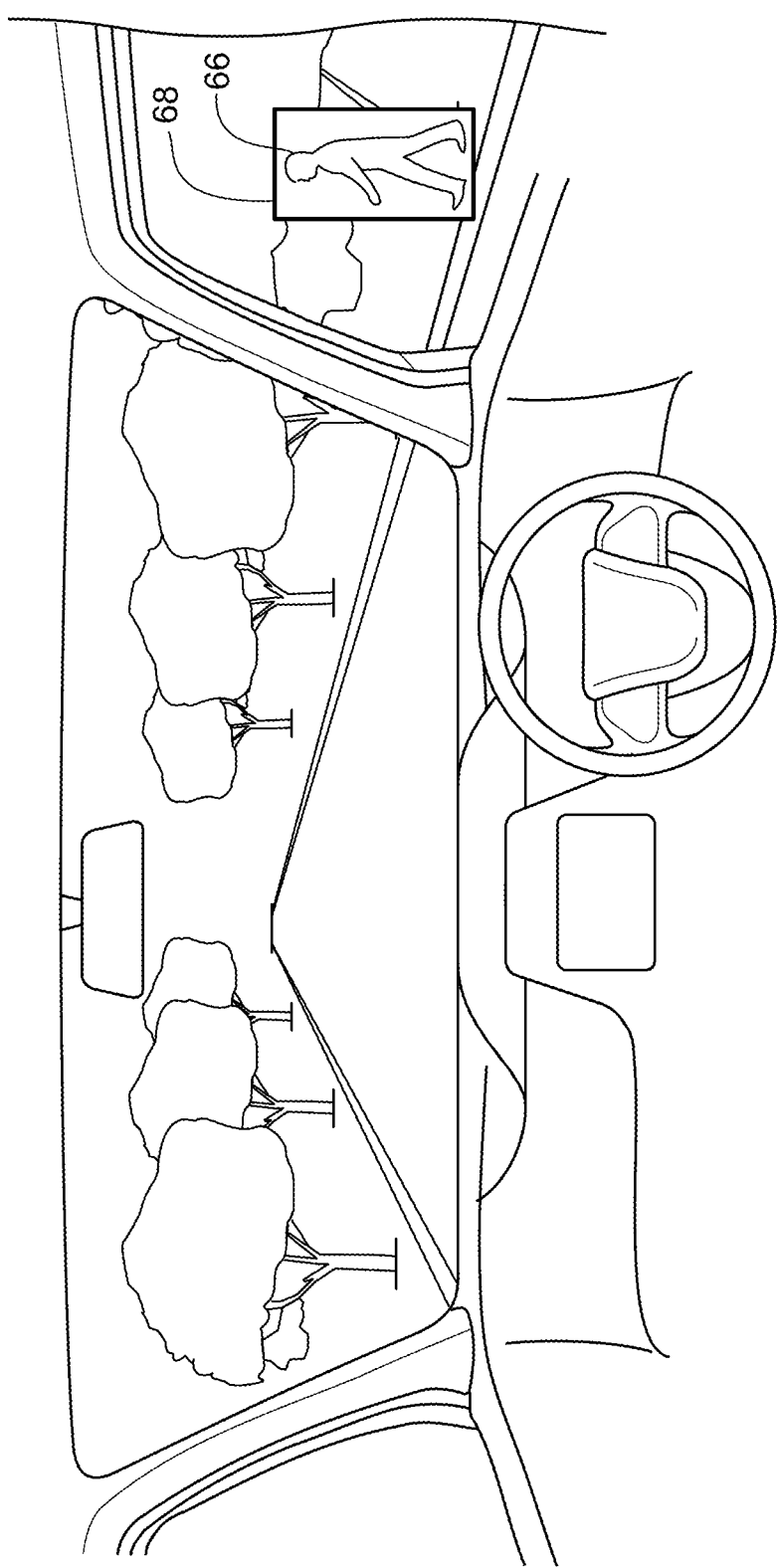
FIG. 6 is an image illustrating an example of a field of view seen by an occupant through the AR glasses.

FIG. 6 illustrates an example of a field of view seen through the AR glasses 40 by the occupant wearing the AR glasses 40 as a result of the processing described above in the situation illustrated in FIG. 5. In the example illustrated in FIG. 6, a graphic 66 representing the walker 62 who is obscured by the obstruction 64 as seen by the occupant wearing the AR glasses 40 is included in the field of view. Therefore, the occupant can be made aware of the presence of the walker 62 who is obscured by the obstruction 64. In the example illustrated in FIG. 6, a rectangular frame 68 that emphasizes the area in which the walker 62 who is obscured by the obstruction 64 is located is also included. Therefore, because the graphic 66 is displayed, a case of the occupant failing to notice the presence of the notified walker 62 who is obscured by the obstruction 64 can be suppressed.

The frame 68 emphasizing the area in which the notification object is located is also displayed in a case in which the notification object is not obscured by an obstruction as seen by the occupant wearing the AR glasses 40. Therefore, even in a case in which a notification object is not obscured by an obstruction, a case of the occupant failing to notice the presence of the notification object can be suppressed.

In step 164, the ITS-ECU 26 makes a determination as to whether the information of all notification objects has been read. If the result of the determination in step 164 is negative, the ITS-ECU 26 returns to step 150 and repeats the processing of steps 150 to 164 until the result of the determination in step 164 is affirmative. After the result of the determination in step 164 become affirmative, the AR display control processing ends and the ITS-ECU 26 returns to the object notification processing in FIG. 3.

Once the present vehicle enters the processing target intersection, the result of the determination in step 104 is affirmative and the ITS-ECU 26 proceeds to step 114. In step 114, the ITS-ECU 26 makes a determination as to whether the turn of the present vehicle at the processing target intersection is a turn across an oncoming lane (a right turn when driving on the left or a left turn when driving on the right). If the result of the determination in step 114 is negative, the ITS-ECU 26 proceeds to step 120.

Alternatively, if the result of the determination in step 114 is affirmative, the ITS-ECU 26 proceeds to step 116. In step 116, the ITS-ECU 26 makes a determination as to whether an oncoming vehicle that will pass the present vehicle is at the processing target intersection. More specifically, the ITS-ECU 26 makes a determination as to whether vehicle information is included in the received infrastructure information. If vehicle information is included in the infrastructure information, then on the basis of a position and progress direction of a vehicle represented by the vehicle information, the ITS-ECU 26 makes a determination as to whether an oncoming vehicle that will pass the present vehicle at the processing target intersection is present. If the result of the determination in step 116 is negative, the ITS-ECU 26 proceeds to step 120.

On the other hand, if an oncoming vehicle that will pass the present vehicle at the processing target intersection is present, the oncoming vehicle may approach to within a predetermined distance as the present vehicle is turning at the processing target intersection. Therefore, if the result of the determination in step 116 is affirmative, the ITS-ECU 26 proceeds to step 118. In step 118, the ITS-ECU 26 specifies that the oncoming vehicle passing the present vehicle at the processing target intersection is a notification object.

An oncoming vehicle is mentioned as an example of a vehicle that is a notification object, but this is not limiting. If a vehicle is located on a road that intersects with the road along which the present vehicle is running at the processing target intersection, this vehicle may also be a notification target.

In step 120, the ITS-ECU 26 makes a determination, similarly to the above-described step 108, as to whether an object such as a walker, a cyclist or the like is located beyond the turn by the present vehicle at the processing target intersection. If the result of the determination in step 120 is affirmative, the ITS-ECU 26 proceeds to step 122 and, similarly to the above-described step 110, specifies that the walker, cyclist or the like located within the predetermined range from the expected progress route is a notification object. If the result of the determination in step 120 is negative, the ITS-ECU 26 skips step 122 and proceeds to step 124.

In step 124, the ITS-ECU 26 executes the AR display control processing described above (FIG. 4). In the AR display control processing in step 124, the display may differ from the AR display control processing in step 112 by, for example, the frame emphasizing the area in which a notification object is located being flashed or the like. If no notification object is specified (if no oncoming vehicle, pedestrian or the like is present), the AR display control processing of step 124 is skipped.

In step 126, the ITS-ECU 26 makes a determination as to whether the present vehicle has approached to within a predetermined distance L3 from the notification object (L3<L2<L1). If the result of the determination in step 126 is negative, the ITS-ECU 26 proceeds to step 130. If the result of the determination in step 126 is affirmative, the ITS-ECU 26 proceeds to step 128.

In step 128, the ITS-ECU 26 instructs the AR glasses 40 to output a sound giving an alert of a close approach to the notification object. As a result, the AR glasses control unit 42 emits a sound from the speakers 52 giving the alert of the close approach to the notification object. Thus, the occupant may be made aware that the present vehicle has approached to within the predetermined distance L3 from a notification object. In addition to the notification by sound, for example, the frame emphasizing the area in which the notification object is located may be flashed.

In step 130, the ITS-ECU 26 acquires results of detection of the eyeline of the occupant wearing the AR glasses 40 according to the eyeline cameras 50 of the AR glasses 40. In step 132, on the basis of the eyeline detection results acquired in step 130, the ITS-ECU 26 makes a determination as to whether the graphic 66 and frame 68 or the like displayed at the display unit 46 of the AR glasses 40 has been seen by the occupant wearing the AR glasses 40. More specifically, the ITS-ECU 26 makes a determination as to whether, for example, the eyeline of the occupant wearing the AR glasses 40 has spent at least a predetermined duration (for example, a duration of around one second) at the display position of the graphic 66 and frame 68 or the like in the display unit 46 of the AR glasses 40.

If the result of the determination in step 132 is negative, the ITS-ECU 26 proceeds to step 136. Alternatively, if the result of the determination in step 132 is affirmative, the ITS-ECU 26 may determine that the occupant wearing the AR glasses 40 is aware of the presence of the notification object corresponding with the graphic 66 and frame 68 or the like seen by the occupant wearing the AR glasses 40, and the ITS-ECU 26 proceeds to step 134.

In step 134, the ITS-ECU 26 causes a display at the display unit 46 of the AR glasses 40, in which the display of the graphic 66 and frame 68 or the like that the ITS-ECU 26 determines has been seen by the occupant wearing the AR glasses 40 is erased. Thus, overcrowding of displays of the graphic 66, the frame 68 and the like in the display unit 46 of the AR glasses 40 may be suppressed.

This processing to erase the display of the graphic 66 and frame 68 or the like that has been seen by the occupant wearing the AR glasses 40 is not required processing. For example, step 134 may be omitted and the graphic 66 and frame 68 or the like displayed in the display unit 46 of the AR glasses 40 may continue to be displayed after the ITS-ECU 26 determines that the graphic 66 and frame 68 or the like have been seen by the occupant wearing the AR glasses 40.

In step 136, the ITS-ECU 26 makes a determination as to whether the present vehicle has departed from the processing target intersection. If the result of the determination in step 136 is negative, the ITS-ECU 26 returns to step 126 and repeats the processing from step 126. Alternatively, if the result of the determination in step 136 is affirmative, the ITS-ECU 26 erases displays of the graphic 66 and frame 68 or the like that are displayed in the display unit 46 of the AR glasses 40, and then returns to step 100.

Thus, in the present exemplary embodiment, the mobile communications unit 30 acquires information of an object located at the progress path of the vehicle from the traffic condition provision system 12 and, on the basis of the information acquired by the mobile communications unit 30, the ITS-ECU 26 causes information of the object to be displayed at the display unit 46 of the AR glasses 40 that are provided with the display unit 46 and are worn by an occupant of the vehicle 22. As a result, the occupant may be allowed to easily understand information of the object that is located in the progress path of the vehicle 22.

In the present exemplary embodiment, the ITS-ECU 26 displays the information of the object at a position in the display unit 46 of the AR glasses 40 that corresponds with the direction in which the object is located as seen by the occupant. Therefore, the occupant may be allowed to easily understand the information of the object located in the progress path of the vehicle 22.

In the present exemplary embodiment, in a case in which the ITS-ECU 26 determines that the object is obscured by an obstruction as seen by the occupant, the ITS-ECU 26 displays information of the object in the display unit 46 of the AR glasses 40. Thus, overcrowding of displays in the display unit 46 of the AR glasses 40 may be suppressed.

In the present exemplary embodiment, the vicinity imaging cameras 48 are provided at the AR glasses 40, and the ITS-ECU 26 makes a determination as to whether an object is obscured by an obstruction as seen by the occupant on the basis of a vicinity imaging image in which the vicinity of the vehicle is imaged by the vicinity imaging cameras 48. Therefore, errors in determinations as to whether objects are obscured by obstructions as seen by the occupant may be reduced.

In the present exemplary embodiment, as the information of the object, the ITS-ECU 26 displays a graphic schematically representing an outline of the object. Therefore, the occupant may be allowed to instinctively understand the presence of the object.

In the present exemplary embodiment, after the ITS-ECU 26 displays the information of the object at the AR glasses 40, the display of the information of the object is erased in a case in which the ITS-ECU 26 determines that the occupant is aware of the information of the object. Therefore, overcrowding of displays at the display unit of the wearable terminal may be suppressed, and understanding by an occupant of the location of an object that the occupant was not aware of may be facilitated.

In the present exemplary embodiment, the ITS-ECU 26 makes a determination as to whether the information of the object has been perceived by the occupant on the basis of results of detection of the direction of an eyeline of the occupant by an eyeline detection unit provided at the AR glasses 40. Therefore, an increase in complexity of operations by the occupant may be avoided.

Hereabove, a mode is described in which information of an object located at the progress path of the vehicle 22 is acquired from the traffic condition provision system 12, but this is not limiting. For example, information of the above-mentioned object may be acquired from one or more of a camera, lidar and radar included in the vehicle-mounted sensors 32.

Figure 7:
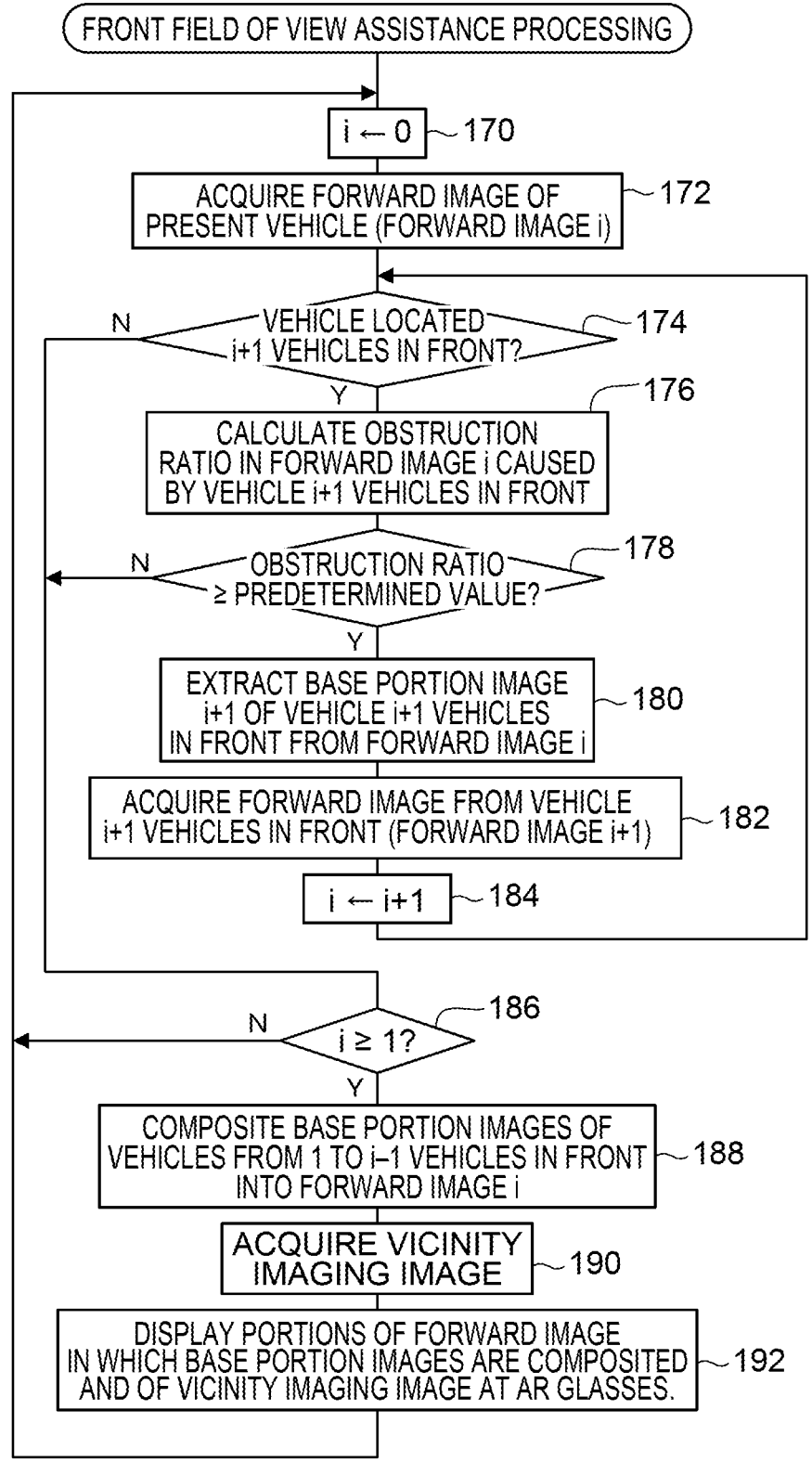
FIG. 7 is a flowchart illustrating front field of view assistance processing that is executed by the ITS-ECU.

Hereabove, a mode is described in which, when the vehicle 22 is passing through an intersection, images (the graphic 66, the frame 68 and the like) drawing attention to the presence of objects such as vehicles, walkers, cyclists and the like are displayed at the display unit 46 of the AR glasses 40. However, situations in which images are displayed at the display unit 46 of the AR glasses 40, and what images are displayed at the display unit 46 of the AR glasses 40, are not limited by the above descriptions. For example, a mode is described below in which, in a case in which the front field of view is impeded by a preceding vehicle running in front of the present vehicle, an image supplementing the front field of view is displayed at the display unit 46 of the AR glasses 40 by the ITS-ECU 26 executing the front field of view assistance processing illustrated in FIG. 7. In this case, a control program that causes the ITS-ECU 26 to execute the front field of view assistance processing is stored in the storage unit of the ITS-ECU 26, and the CPU of the ITS-ECU 26 reads the control program from the storage unit, loads the control program into the memory, and executes the loaded control program.

Figure 8:
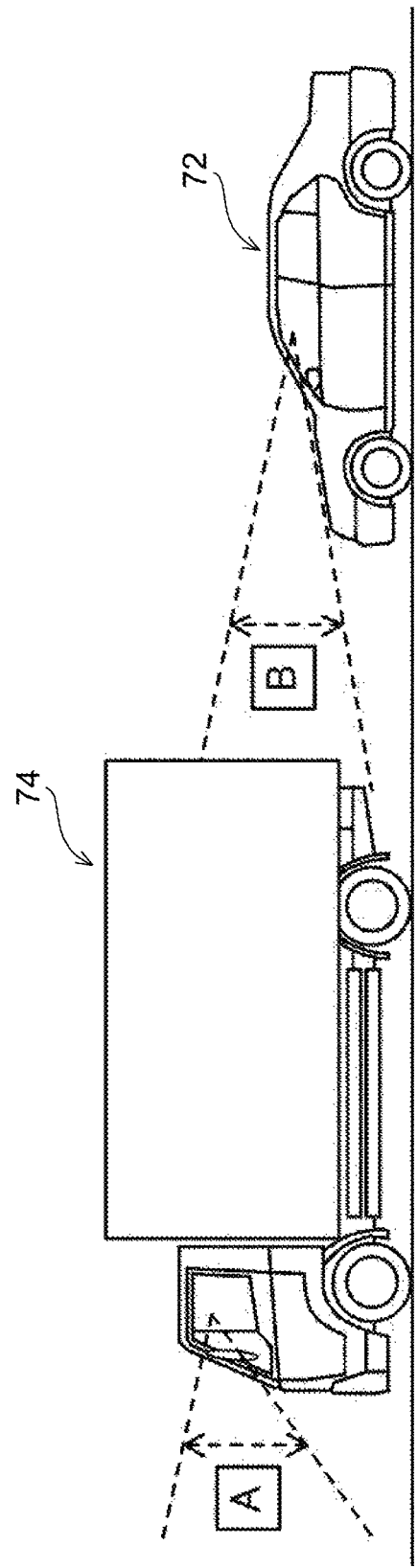
FIG. 8 is a side view illustrating an example of a situation in which a vehicle with a high field of view obstruction ratio is located in front of the present vehicle.

In step 170 of the front field of view assistance processing, the ITS-ECU 26 resets a variable i for identifying the present vehicle and vehicles in front of the present vehicle to zero. In step 172, the ITS-ECU 26 acquires a forward image imaged in front of the present vehicle from a camera included in the vehicle-mounted sensors 32 of the present vehicle. Below, a forward image imaged by a vehicle that is i vehicles in front of the present vehicle is referred to as "forward image i"; the forward image imaged by the present vehicle is referred to as "forward image 0". An example of an image range of front image 0 is illustrated in FIG. 8, marked with the reference symbol "B".

In step 174, the ITS-ECU 26 makes a determination based on forward image i as to whether a vehicle is located i+1 vehicles in front of the present vehicle. If the result of the determination in step 174 is negative, the ITS-ECU 26 proceeds to step 186. In step 186, the ITS-ECU 26 makes a determination as to whether the variable i is at least 1. If the result of the determination in step 186 is negative, the ITS-ECU 26 returns to step 170. Thus, in a case in which there are no vehicles in front of the present vehicle, no processing is executed to display an image at the display unit 46 of the AR glasses 40.

Alternatively, if a vehicle is located i+1 vehicles in front of the present vehicle, the result of the determination in step 174 is affirmative and the ITS-ECU 26 proceeds to step 176. In step 176, the ITS-ECU 26 calculates an obstruction ratio in forward image i caused by the vehicle that is i+1 vehicles in front of the present vehicle. The term "obstruction ratio" as used herein may include the use of a ratio of an area of an image region corresponding to the vehicle that is i+1 vehicles in front relative to the total area of forward image i. However, this is not limiting; an alternative index relating to a proportion of forward image i that is obstructed by the vehicle i+1 vehicles in front may be used.

Figure 9:
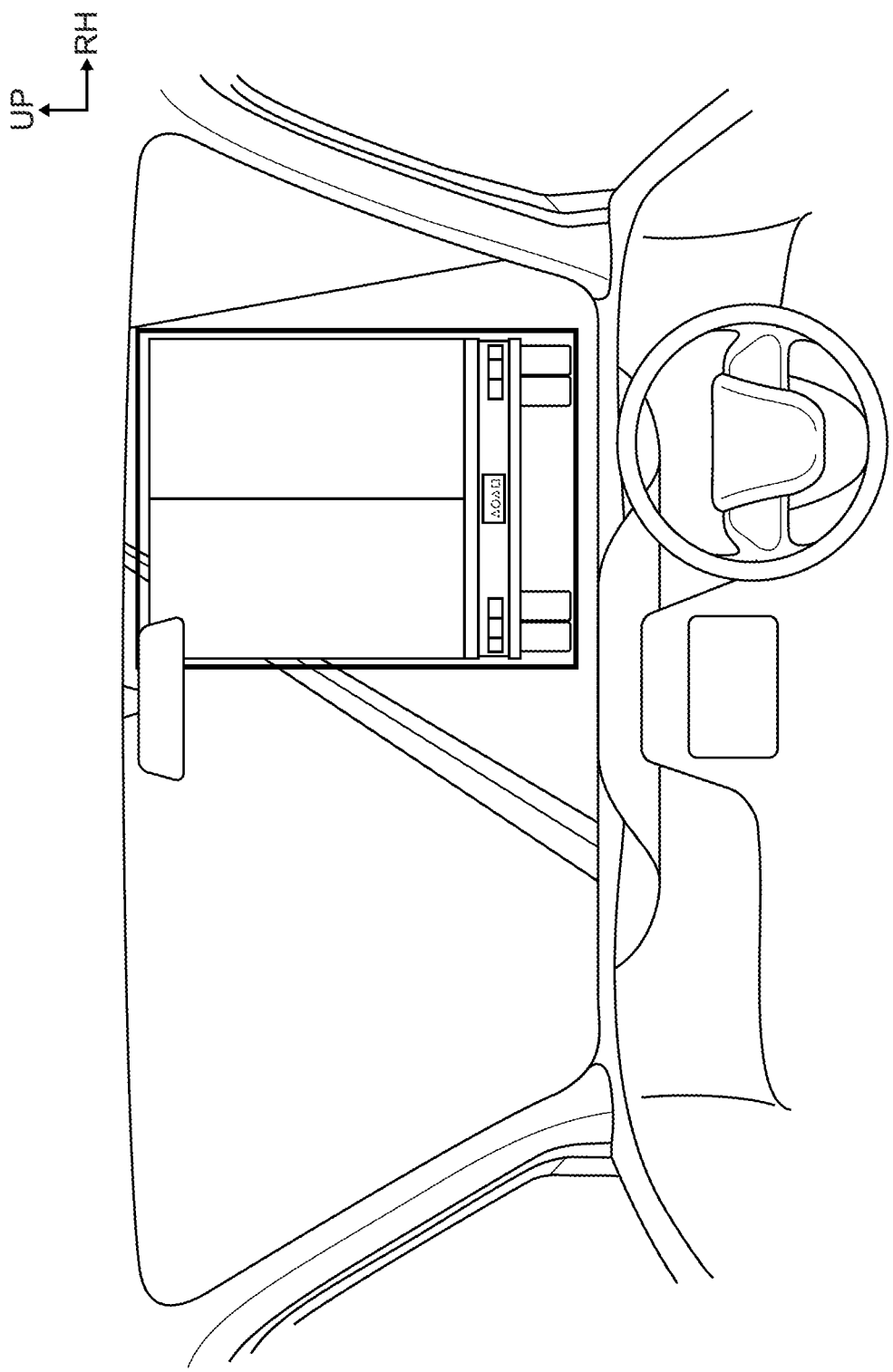
FIG. 9 is an image illustrating an example of a field of view seen by the occupant in the situation illustrated in FIG. 8.

In step 178, the ITS-ECU 26 makes a determination as to whether the obstruction ratio calculated in step 176 is at least a predetermined value. If the result of the determination in step 178 is negative, the ITS-ECU 26 proceeds to step 186. On the other hand, in a situation as illustrated by the example in FIG. 8 in which a high-bodied preceding vehicle 74 such as a truck, a bus or the like is located in front of a present vehicle 72, as illustrated by the example in FIG. 9, the forward field of view of the present vehicle 72 is greatly obstructed. In this kind of situation, the result of the determination in step 178 is affirmative and the ITS-ECU 26 proceeds to step 180.

Figure 10:
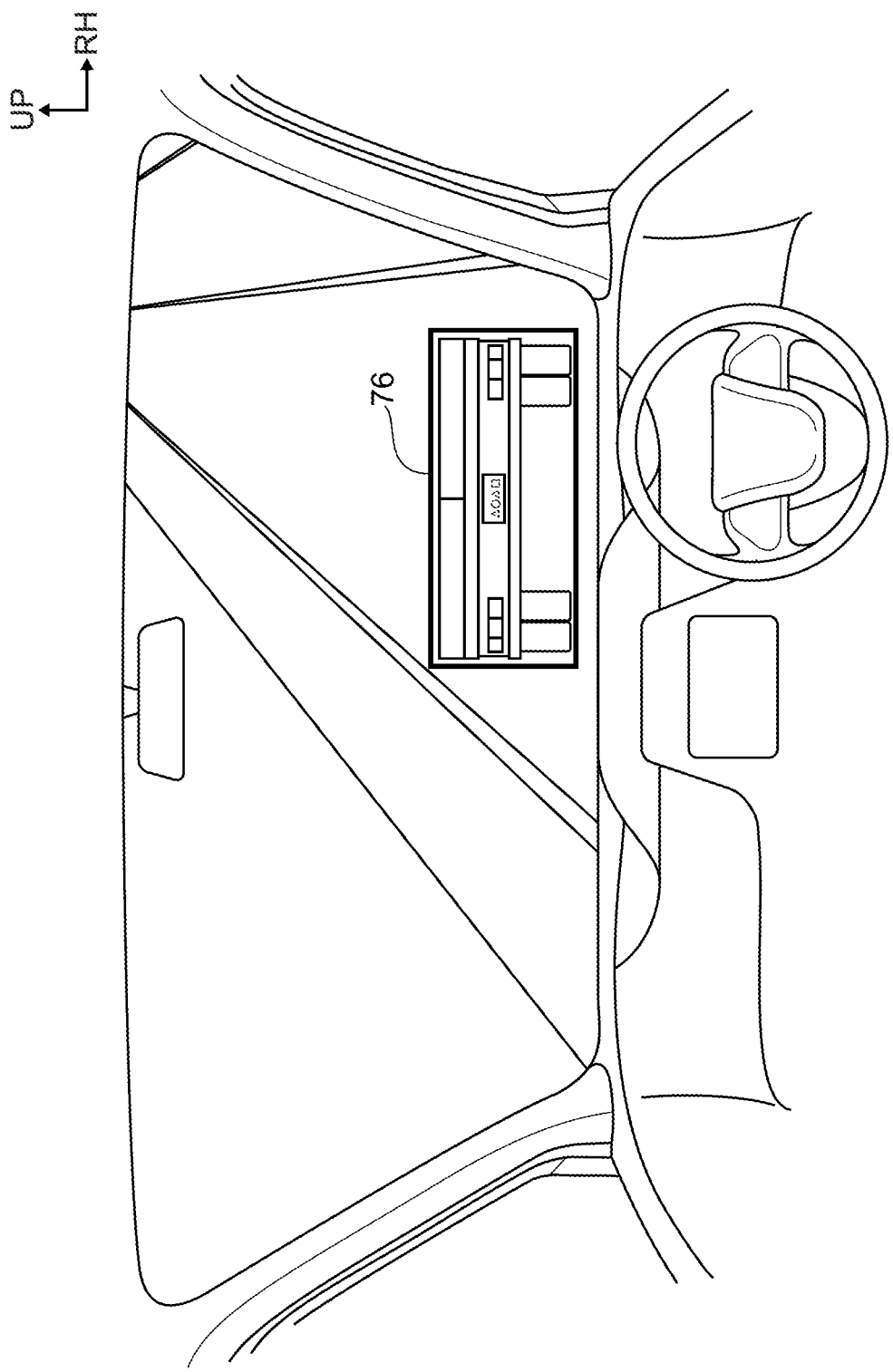
FIG. 10 is an image illustrating an example of the field of view seen by the occupant through the AR grasses as a result of front field of view improvement processing.

In step 180, from an image region in forward image i depicting the vehicle that is i+1 vehicles in front of the present vehicle, the ITS-ECU 26 extracts an image depicting a lower portion close to the surface of the road (below, this image is referred to as "base portion image i+1"). An example of a base portion image is illustrated in FIG. 10 marked with the reference symbol "76". Then, in step 182, the ITS-ECU 26 acquires position information (longitude and latitude) of the vehicle i+1 vehicles in front and a forward image (forward image i+1) imaged by a camera provided at the vehicle i+1 vehicles in front, from the vehicle i+1 vehicles in front via the mobile communications network 20. An example of the image range of forward image 1 is illustrated in FIG. 8 marked with the reference symbol "A".

In step 184, the ITS-ECU 26 increments the variable i by 1, and returns to step 174. Thus, the ITS-ECU 26 repeats the processing of steps 174 to 184 until the result of a determination in step 174 or step 178 is negative. Therefore, for example, if a preceding vehicle a is located one vehicle in front of the present vehicle, a preceding vehicle b is located one vehicle in front of preceding vehicle a, preceding vehicle a has a high obstruction ratio relative to the forward field of view from the present vehicle, and preceding vehicle b has a high obstruction ratio relative to the forward field of view from preceding vehicle a, respective base portion images of the preceding vehicles a and b are extracted.

If the result of the determination in step 174 or step 178 is negative, the ITS-ECU 26 proceeds to step 186. Because the variable i is incremented in a case in which a base portion image of a preceding vehicle has been extracted, the result of the determination in step 186 is affirmative and the ITS-ECU 26 proceeds to step 188. In step 188, the ITS-ECU 26 composites the base portion images of the vehicles between 1 and i−1 vehicles in front into forward image i.

In step 190, the ITS-ECU 26 acquires a vicinity imaging image imaged by the vicinity imaging cameras 48 of the AR glasses 40. In step 192, on the basis of a difference between the position (latitude and longitude) of the present vehicle 72 detected by the GPS sensor 28 and the position (latitude and longitude) of the vehicle i vehicles in front that imaged the forward image i, the ITS-ECU 26 applies a coordinate conversion or the like to the forward image i into which the base portion images have been composited so as to simulate a field of view from the occupant of the present vehicle 72. Then, the ITS-ECU 26 composites the front image i that has been composited with the base portion images and subjected to coordinate conversion or the like with the vicinity imaging image. Thus, the ITS-ECU 26 creates an image that takes account of differences between the forward image i and the vicinity imaging image, and displays the created image at the display unit 46 of the AR glasses 40. After the processing of step 192 is executed, the ITS-ECU 26 returns to step 170

An example of a field of view that can be seen through the AR glasses 40 by the occupant wearing the AR glasses 40 as a result of the processing described above is illustrated in FIG. 10. In the example illustrated in FIG. 10, a region that would be obscured by an upper side portion of a preceding vehicle in the forward field of view seen by the occupant wearing the AR glasses 40 is included in the field of view. Thus, the forward field of view for the occupant wearing the AR glasses 40 is improved. In the example illustrated in FIG. 10, a lower side portion of the preceding vehicle is included in the field of view of the occupant wearing the AR glasses 40 as the base portion image 76. Therefore, the occupant wearing the AR glasses 40 can be made aware of the presence of the preceding vehicle.

FIG. 10 illustrates an example in which the lower side portion of the preceding vehicle is displayed as the base portion image 76, but this is not limiting. For example, if the present vehicle 72 is conducting autonomous driving at Level 4 or above, there is little necessity for the occupant wearing the AR glasses 40 to be aware of the presence of a preceding vehicle. In this kind of situation, the base portion image 76 need not be displayed, for example, as illustrated in FIG. 11.

In the above descriptions, a mode is described in which no head-up display (HUD) is provided at the front windshield of the vehicle 22. If equivalent functions to the AR glasses 40 described above are to be provided by a HUD, a very large HUD is necessary. Therefore, cost, weight and power consumption increase, and ease of installation and ease of servicing for replacement deteriorate. Extending the display screen of a HUD as far as the vicinity of an A pillar of the vehicle, or a side window or the like, is physically impractical in regard to space for installation. Furthermore, if information of an object is to be displayed at a position of a HUD that corresponds with a point at which a line joining the eyeline of the occupant with the object crosses the front windshield, this position is affected by differences in sitting posture and differences in eyeline height between occupants. Because it is troublesome to adjust the display for each occupant, this would be impractical.

In contrast, because the AR glasses 40 are disposed at positions close to the eyes of an occupant, a display area of the display unit 46 may be kept small even when a display range is specified to encompass the A pillar vicinities, side windows and the like of the vehicle, and cost, weight and power consumption may be restrained. Furthermore, even when information of an object is displayed at a position corresponding with the point at which a line joining the eyeline of the occupant with the object crosses the front windshield, this position is not affected by differences in sitting posture and differences in eyeline height between occupants. Therefore, this may be implemented easily.

However, the present disclosure is not limited to modes in which no HUD is provided in the vehicle 22. For example, as illustrated in FIG. 12, the present disclosure may be employed in a structure in which a HUD 80 is provided at the vehicle-mounted system 24 of the vehicle 22. In this case, in a case in which the ITS-ECU 26 determines that an object is located in a direction as seen by the occupant that is projected in the HUD 80, the ITS-ECU 26 displays information of the object at the HUD 80. Alternatively, in a case in which the ITS-ECU 26 determines that an object is located in a direction as seen by the occupant that is not projected in the HUD 80, the ITS-ECU 26 displays the information of the object at the display unit 46 of the AR glasses 40. Therefore, information in a range that cannot be displayed at the HUD 80, for example, information in a range corresponding with an A pillar, side window or the like of the vehicle, may be displayed. Thus, displays by the HUD 80 may be complemented by the AR glasses 40.

Programs such as the control program of the present disclosure and the like may be stored at an external server and loaded into memory via a network. Further, programs such as the control program and the like may be stored on non-transitory storage media such as a DVD (digital versatile disc) or the like and loaded into memory via a storage medium reading device.

What is claimed is:

1. A display control device for a vehicle, comprising:
an acquisition unit that acquires information of an object located at a progress path of the vehicle, the progress path being a path along which the vehicle is expected to proceed after turning at an intersection;
a memory; and
a processor coupled to the memory, the processor configured to:
on the basis of the information acquired by the acquisition unit, cause a display unit of a spectacles-form wearable terminal to display information of the object to be displayed, the wearable terminal being provided with the display unit and being configured to be worn by an occupant of the vehicle;
receive eyeline detection results from a pair of eyeline cameras provided at the wearable terminal that image eyes of the occupant to determine an eyeline of the occupant;
determine whether the information of the object has been perceived by the occupant based on the eyeline detection results; and
after causing the display unit to display the information of the object, upon determination that the information of the object has been perceived by the occupant, cause the display device to erase the display of the information of the object.

2. The display control device for a vehicle according to claim 1, wherein the processor is further configure to cause the display unit to display the information of the object at a position of the display unit that corresponds with a direction in which the object is located as seen by the occupant.

3. The display control device for a vehicle according to claim 1, wherein the processor is further configure to cause the display unit to display the information of the object in a case in which the processor determines that the object is obscured by an obstruction as seen by the occupant.

4. The display control device for a vehicle according to claim 3, wherein a vicinity imaging unit is provided at the wearable terminal, and the processor is further configure to determine as to whether the object is obscured by an obstruction as seen by the occupant on the basis of a vicinity imaging image in which a vicinity of the vehicle is imaged by the vicinity imaging unit.

5. The display control device for a vehicle according to claim 1, wherein the processor is further configured to cause the display unit to display a graphic schematically representing an outline of the object as the information of the object.

6. The display control device for a vehicle according to claim 1, wherein a head-up display is provided at a front windshield of the vehicle, and the processor is further configured to cause the display unit to display the information of the object in a case in which the processor determines that the object is located in a direction as seen by the occupant that is not projected in the head-up display.

7. A display control method for a vehicle, comprising:
acquiring information of an object located at a progress path of the vehicle, the progress path being a path along which the vehicle is expected to proceed after turning at an intersection; and,
on the basis of the acquired information, controlling such that information of the object is displayed at a display unit of a spectacles-form wearable terminal, the wearable terminal being provided with the display unit and being worn by an occupant of the vehicle;
receiving eyeline detection results from a pair of eyeline cameras provided at the wearable terminal that image eyes of the occupant to determine an eyeline of the occupant;
determining whether the information of the object has been perceived by the occupant based on the eyeline detection results; and
after causing the display unit to display the information of the object, upon determination that the information of the object has been perceived by the occupant, causing the display device to erase the display of the information of the object.

8. A non-transitory computer readable storage medium storing a program causing a computer to execute display control processing for a vehicle, the display control processing for a vehicle comprising:
acquiring information of an object located at a progress path of the vehicle, the progress path being a path along which the vehicle is expected to proceed after turning at an intersection; and,
on the basis of the acquired information, controlling such that information of the object is displayed at a display unit of a spectacles-form wearable terminal, the wearable terminal being provided with the display unit and being worn by an occupant of the vehicle;
receiving eyeline detection results from a pair of eyeline cameras provided at the wearable terminal that image eyes of the occupant to determine an eyeline of the occupant;
determining whether the information of the object has been perceived by the occupant based on the eyeline detection results; and
after causing the display unit to display the information of the object, upon determination that the information of the object has been perceived by the occupant, causing the display device to erase the display of the information of the object.

9. The display control method according to claim 7, further comprising:

controlling such that the information of the object is displayed at a position of the display unit that corresponds with a direction in which the object is located as seen by the occupant.

10. The display control method according to claim 7, further comprising:

controlling such that the information of the object is displayed in a case in which it is determined that the object is obscured by an obstruction as seen by the occupant.

11. The display control method according to claim 7, further comprising:

controlling such that the information of the object is displayed at the display unit in a case in which it is determined that the object is located in a direction as seen by the occupant that is not project in a head-up display.

12. The non-transitory computer readable storage medium according to claim 8, the display control processing further comprising:

controlling such that the information of the object is displayed at a position of the display unit that corresponds with a direction in which the object is located as seen by the occupant.

13. The non-transitory computer readable storage medium according to claim 8, the display control processing further comprising:

controlling such that the information of the object is displayed in a case in which it is determined that the object is obscured by an obstruction as seen by the occupant.

14. The non-transitory computer readable storage medium according to claim 8, the display control processing further comprising:

controlling such that the information of the object is displayed at the display unit in a case in which it is determined that the object is located in a direction as seen by the occupant that is not project in a head-up display.

15. The display control device for a vehicle according to claim 1, wherein the information of an object comprises information of at least one of a movement direction of the object or a movement speed of the object.

16. The display control device for a vehicle according to claim 1, wherein the processor is further configured to, in a case in which a distance between the vehicle and the object becomes equal to or less than a predetermined value, instruct a speaker of the wearable terminal to output a sound giving an alert.

* * * * *